United States Patent [19]

Goleh

[11] Patent Number: 5,372,507

[45] Date of Patent: Dec. 13, 1994

[54] MACHINE-AIDED TUTORIAL METHOD

[76] Inventor: F. Alexander Goleh, 5447 White Oak Ave., #201, Encino, Calif. 91316

[21] Appl. No.: 16,809

[22] Filed: Feb. 11, 1993

[51] Int. Cl.5 .......................................... G09B 19/00
[52] U.S. Cl. .................... 434/118; 434/219; 434/323; 434/362; 364/406; 395/927
[58] Field of Search ................ 434/107–109, 434/118, 219, 307, 322, 323, 327, 335, 336, 350, 359, 362, 365; 364/401, 406, 578; 395/144, 152, 375, 927

[56] References Cited

U.S. PATENT DOCUMENTS

| | | | |
|---|---|---|---|
| 3,749,892 | 7/1973 | Stenning | 364/406 X |
| 4,642,767 | 2/1987 | Lerner | 364/406 |
| 4,652,940 | 3/1987 | Sumiyoshi | 364/406 X |
| 4,671,772 | 6/1987 | Slade et al. | 434/219 |
| 4,673,802 | 6/1987 | Ohmae et al. | 364/406 X |
| 4,727,243 | 2/1988 | Savar | 364/406 X |
| 4,736,094 | 4/1988 | Yoshida | 364/406 X |
| 4,867,685 | 9/1989 | Brush et al. | 434/234 |
| 4,895,518 | 1/1990 | Arnold et al. | 434/118 |

Primary Examiner—Richard J. Apley
Assistant Examiner—Joe H. Cheng
Attorney, Agent, or Firm—Robert Louis Finkel

[57] ABSTRACT

A method for teaching the practical application of a subject. The student is furnished an introductory body of information encompassing the subject and presented with a simulated life-like situation having a stated goal. Attaining the goal requires the completion, in order, of a series of steps utilizing the information. Each of the steps except for the first can be undertaken only upon the completion of a previous step, and once completed, a step cannot be repeated. Each completed step thus effectively becomes a part of the body of information comprising the subject. The student is able to exit any of the steps at will for the purpose of reviewing the body of information and thereafter to return directly to the exited step.

17 Claims, 8 Drawing Sheets

MACHINE-AIDED TUTORIAL METHOD

BACKGROUND OF THE INVENTION

1. Field of the Invention

This invention related to methods for tutoring students, and more particularly a machine- or computer-aided instructional method that presents the student with life-like situations that would be encountered upon mastering of the tutored subject.

2. Description of the Related Art Including Information Disclosed Under 37. C.F.R. §§1.97–1.98

In order to learn an unfamiliar (yet well-established) subject, there are often many means by which the knowledge of that subject may be acquired. However, these previous means often split the subject matter up into categories so that the matter might be more easily taught or more easily learned. Splitting the subject matter up into categories can provide the student with fundamental lessons that are easy to grasp. However, upon facing a real-life situation that requires the integration and synthesis of what has been learned in order to perform a complex task, the student may be daunted and/or overwhelmed with the complexity of that task. While the lessons may have prepared the student to perform each individual act or item that is required to accomplish the task as a whole, putting all that has been learned together in a coordinated and useful manner has often been relegated to on-the-job training. This limits the student's usefulness when first addressing real-life situations. When the student undertakes the problems addressed by the lessons, the student still lacks the necessary experience and must gain further knowledge before becoming proficient in that field.

Textbooks and other written instructional works are the classical means by which knowledge is conveyed to students. The material presented to the student through textbooks and other written works do not provide dynamic feedback to the student and when the student applies the knowledge gained from textbooks, mistakes made by the student cannot be recognized and corrected until another reviews the student's work, or until the student discovers the mistake. The ultimate goal of any learning process is the correct application of that which has been learned. With textbooks and written materials, when the knowledge learned is applied by the student to a specific situation, there is no assurance that the student's knowledge has been applied correctly.

Further, textbooks often deal with the instructional subject matter in separated segments as chapters. The chapters of a textbook often set forth their subject matter independently of the other chapters. Exercises and questions often present at the end of such chapters do not tend to weave together the different subjects of the previous chapters, although the questions may rely upon work previously done by the student. Due to textbook's presentation of subject matter in an independent and separated manner, the continuity of the subject matter can be interrupted, leaving the student without knowledge crucial to the successful application of what has been learned. Although the textbook has presented to the student the elements required to address real-life situations and problems, the practical relationships existing between the various elements may not be so easily addressed and may present issues not set forth in a textbook.

Like the textbooks in which they appear, question and answer sections often found at the end of the textbook chapters suffer from their independent and isolated approach to the subject matter they address. Material from other chapters is not directly addressed as the subject matter of the immediately preceding chapter is considered more pertinent. A student's answers to questions at a chapter's end are only given feedback by comparison to the answers that may also be included with the questions. Explanations for these answer may be absent, preventing the student from learning the process by which the correct answer may be obtained. Often, having consulted an available answer section, the student's interest may flag so that the next question can be addressed. By providing the answer to the student, better learning of the subject matter by the student may be diminished. Upon arriving at an answer, the student has no second chances to independently arrive at the correct answer once a correct answer is provided to the student. The question itself cannot provide clues or guidelines in the right context for the student's better understanding as the static nature of the media presenting the question (textbooks) cannot gauge and anticipate the student's activities.

Another means by which a student can learn a previously well-established subject is by preparing and/or creating in-class or take-home projects. Such projects normally enhance the learning process by requiring from the student greater initiative and effort over an extended period of time. Such projects can be accomplished individually or on a group basis and may or may not be supervised by an instructor.

In-class or take-home projects can require a significant amount of instructor's time in order to guide the student(s) through the learning process. If the student(s) are left to pursue the project on their own, any errors generated and included in the project may detrimentally affect, even jeopardize, the learning objects sought by the project. While such projects can bridge the gap between the discrete subject matters set forth in textbooks and classes, errors made early in the project can be difficult to locate and correct. Such early errors can also lead the student astray by pursuing courses of action that miss the learning objectives of the project.

Preparatory courses can be of some limited help to students as they can prepare them for professional examinations and/or train them for particular jobs. Such preparatory courses are usually costly and require the assistance of an instructor. The correspondence types of such preparatory courses may be akin to textbooks with questions and answers and/or test and quiz publications.

Test and quiz publications can provide a measure by which the student's grasp of the subject can be evaluated. Such test and quiz publications do not provide specific information about the questions or problems presented to the student in an interactive manner than can anticipate the challenges that might present themselves to the student. In learning a new subject, a student can benefit from challenges that force the student to extend what learning has been previously attained. However, if the challenges are too great, the student may become dismayed at the amount of work that remains to be performed and the amount of learning that remains to be understood. Furthermore, test and quiz publications cannot address issues of continuity from one discrete subject matter to another unless such test or quizzes are in the form of practice sets. Practice sets also suffer from the same limitations as class and take-home projects. If answers are provided for the student so that the student's answer can be compared to the correct answers, second attempts by the student to attain the correct answer are diminished, as for textbook questions and answers. If the answers are not provided, incorrect responses will affect the outcome of a series of related questions and almost always defeat the learning objective of the test or quiz publication. No hands-on learning experience can be conveyed to the student through test or quiz publications.

SUMMARY OF THE INVENTION

The present invention sets forth a machine- or computer-aided instructional method for assisting students in assimilating and performing work-related, real-life professional tasks.

While the embodiment set forth in detail further below is applicable to several professional fields such as medicine, law, engineering, etc., the field of accounting is seen as being that which is best used to set forth the invention. In accountancy, transactions having a financial impact upon a business are recorded and organized so that the fiscal status of the business can be determined with objective regularity.

The present invention initially provides the accounting student with a progression of instructional and/or informative screens that set forth the knowledge required to accomplish the real-like tasks that will be required of the student. Through a menu-based system, the student is guided through these tasks accompanied by the watchful eye of the tutorial that monitors and anticipates the student's progress. As the student progresses through the tutorial, information that is necessary to the student's successful completion of the task at hand may be presented in the appropriate context most conductive to the student's best learning of the immediate subject. Should the student supply an erroneous answer, the tutorial will alert the student to the error and request that the student supply the correct information. Continuities of subject matter are inherently presented to the student as the simulation of real-life tasks in a life-like manner by the tutorial follows closely the same requirements and sequence that will be demanded of the student upon mastering the subject and engaging it professionally.

As an additional feature of the tutorial, tasks that have been completed by the student may be accessed in the future by the student for review only. This presents the student from having to spend unnecessary time at any one portion of the tutorial and also provides the student with easily available historical references.

OBJECTS OF THE INVENTION

It is an object of the present invention to provide to a student a tutorial method that provides a life-like situation so that the student may gain hands-on experience.

It is an object of the present invention to implement that tutorial method upon a computer so that the student can conveniently engage the tutorial method and so that the student's progress can be monitored by the computer.

It is an object of the present invention to provide an interactive exercise that allows the student to independently assimilate the necessary guidelines required for performing the life-like situations presented to them.

It is an object of the present invention to provide continuity of subject matter, concepts, and issues to the student in an interactive tutorial.

It is an object of the present invention to provide students with life-like situations continuously monitored by the equivalent of an expert in the field.

It is an object of the present invention to provide questions and to continuously quiz the student's understanding on the concepts underlying the steps of the tutorial.

It is an object of the present invention to provide rules, concepts, and/or answers (as appropriate) to the student.

It is an object of the present invention to provide the student with an infinite number of chances to answer questions or to respond to tasks correctly.

It is an object of the present invention to provide assurances that each step in the tutorial is completed accurately before going on to the next step so that propagation errors are impossible.

It is an object of this invention to save an instructor's time that would otherwise be spent supervising similar projects/tutorials.

It is an object of this invention to provide a student with self-guided and continuously monitored means for correctly learning, assimilating, and applying concepts required in real-life situations while maintaining continuity of subject matter.

These and other objects and advantages of the present invention will be apparent from a review of the following specification and accompanying drawings.

DESCRIPTION OF THE PREFERRED EMBODIMENT(S)

Figure 1:
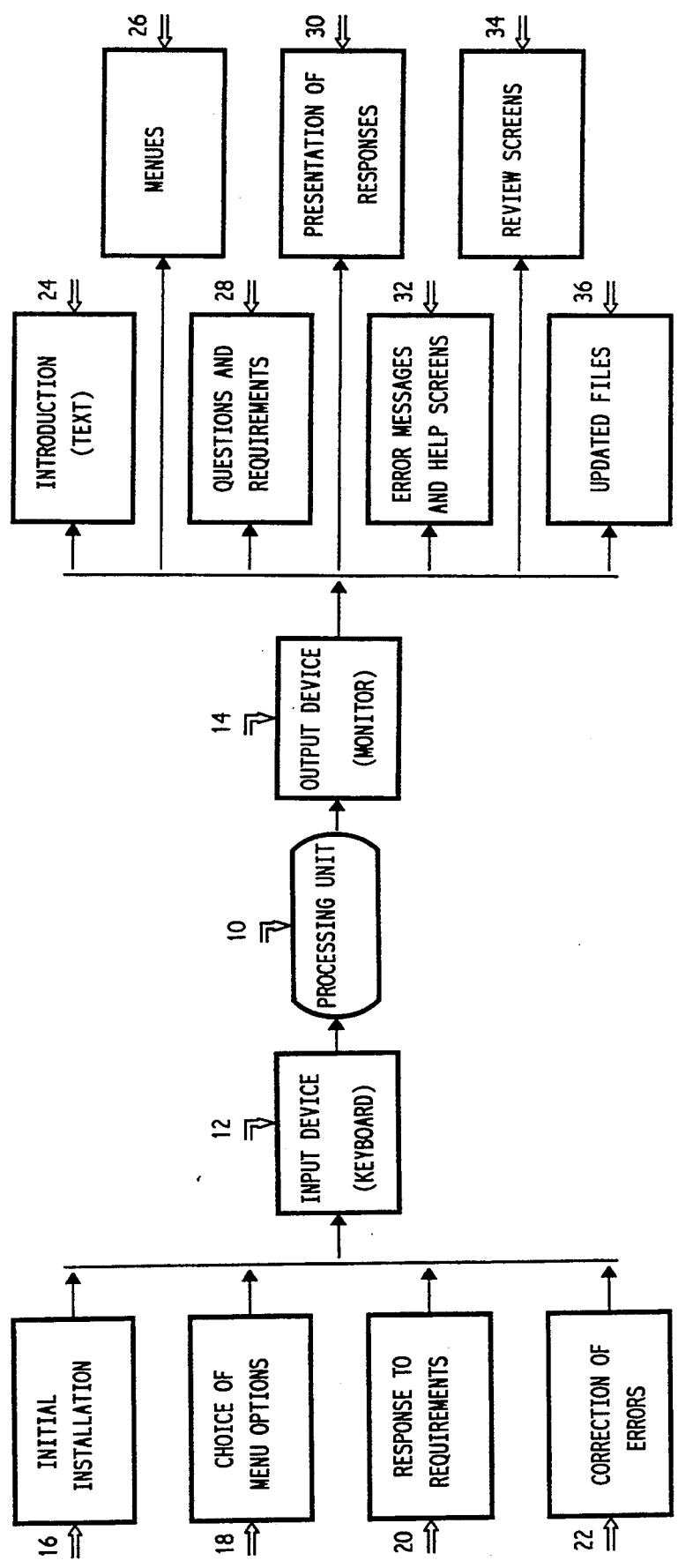
FIG. 1 is a schematic block diagram summarizing the tutorial method of the present invention as implemented on a computer.

As shown in FIG. 1, the computer-aided tutorial method of the present invention relies upon a central processing unit 10 to receive input transmitted to it from an input device 12 (namely, a keyboard) and to transmit output to an output device 14 (namely, a monitor).

The keyboard 12 input device allows the initial installation 16 of the tutorial. The keyboard 12 also allows the student to select one of several choices made available by menu options 18. Once a menu option 18 has been selected, the student may make responses 20 to the requirements and/or demands of the tutorial via the keyboard 12. Should such a response be in error, the student may also correct such errors 22 through the keyboard 12.

Once the student has transmitted input to the processing unit 10 through the keyboard 12, the processing unit 10 acts upon such input as set forth further in the description addressing the tutorial method of the present invention with respect to FIGS. 2a–2e, below. Upon acting upon the keyboard-transmitted input, the action taken by the processing unit 10 is presented to the student by the monitor 14 output device.

The monitor 14 feeds back the output of the processing unit 10 to the student so that the student may better understand the subject matter at hand. In responding to the student's input, the processing unit can (as it implements the tutorial method of the present invention) present several types of responses.

Initially, when the student embarks upon a new area or menu option, introductory text 24 is or can be presented to the student in preparation for the successful performance of upcoming tasks. Upon reading such introductory text 24, the student will gain confidence in the skills learned through the tutorial method of the present invention through positive reinforcement. By correctly responding to the life-like situations, the student's confidence is enhanced. The student's chances for correctly responding to the demands of the life-like situations presented are greatly enhanced by close reading of the introductory text 24.

Possible menu selections 26 may be presented to the student through the monitor 14, to which the student may respond by supplying input 18 through the keyboard 12, to interactively control the operation of the tutorial.

Upon selecting a menu choice 18, the tutorial presents the student with questions and/or requirements 28 to guide the student through the learning process in order to accomplish the learning objectives of the tutorial. When the student responds 20 to the questions/requirements 28 of the tutorial, those responses are presented 30 through the monitor 14 for display to the student. By presenting the student's own responses through the monitor 14, the student can confirm that what was received by the processing unit 10 was what the student intended to supply as the answer/response.

When the student's input 20 in response to the questions/requirement of the tutorial are evaluated, the response may sometimes be in error. If so, the error is detected by the processing unit 10 as it implements the tutorial of the present invention. Upon detection, the student is informed of the error through the monitor 14 and appropriate help is given by the tutorial to the student 32. When the student understands that an erroneous response has been made, such errors can be corrected 22 by further student input through the keyboard 12. The processing unit 10 can then evaluate the student's most recent response to discover if the student has corrected the error. If the student has successfully corrected the error, the next step of the tutorial can be taken as the student is deemed to have successfully accomplished the latest question/requirement of the tutorial. If the student again is in error, an error message and help screen may be presented 32, as for the initial student error. So long as the student erroneously responds to the question/requirement of the tutorial, the tutorial will continue to response to the student by displaying an error message with help 32. The next step in the tutorial will only be taken when the student has successfully completed the life-like task at hand.

Upon successfully completing the most recent question/requirement of the tutorial, the student is allowed to either repeat or review the just-completed question/requirement 34. If the student chooses to review the latest successfully completed question/requirement, that question/requirement as well as the student's correct answer(s)/response(s) are shown to the student via the monitor 14. Also, the student may review any other previous successfully completed question/requirement. In this way, the student may become re-acquainted with previous ideas/concepts without undertaking the question requirement again. Upon completion of the student's review, the next step in the tutorial can be undertaken.

Before the next step in the tutorial is undertaken, any files or information that need to be updated due to the student's correct responses are so updated 36. In this way, future tutorial events, questions, or requirements can rely upon the accurate information present in the updated file from the student's successful and correct responses. As in the embodiment for an accounting tutorial, journal files can be augmented by successful and correct entries made by the student and these journal files can be used, as they would be in real life, to determine accounting events later in the pertinent accounting period. The method of tutoring a student in accounting as set forth herein conforms to generally accepted accounting practices (GAAP).

Referring now to FIGS. 2a–2e, the individual steps taken by the tutorial method of the present invention are set forth in greater detail. The embodiment shown in FIGS. 2a–2e is that for an accounting tutorial, advantageously however, tutorials in other subject matters may be addressed by the method of the present invention. Having set forth the input/output regime of FIG. 1, those details are assumed in explaining the various steps taken by the present tutorial method to convey to the student the subject matter being studied.

Figure 2A:
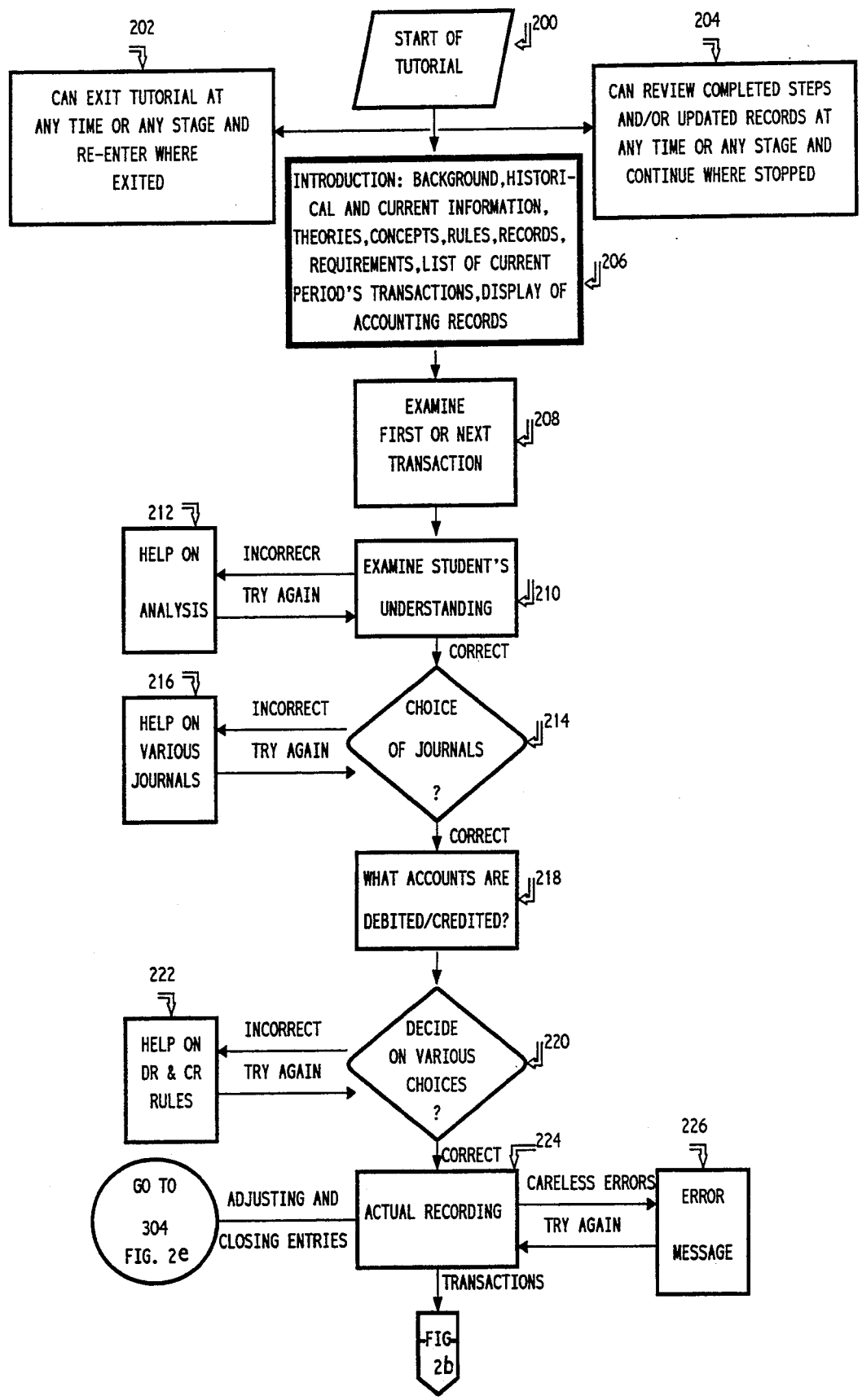
FIGS. 2a–2e are schematic block diagrams showing one embodiment of the present invention as applied to accounting.

As shown in FIG. 2a, the student begins 200 the tutorial by an invoking command that initializes and prepares the tutorial for the student. For the accounting tutorial embodiment, the generation and maintenance of several information files has been found useful so that different portions of the tutorial may operate independently by referring to those files for needed or useful information. Some of these files contain information records that are supplied from the student (with the help of the tutorial).

Once invoked, the tutorial allows the student to exit at any time or at any stage of the tutorial 202. When exit is made by the student from the tutorial, the tutorial saves the point at which the student made exit. When invoked again later, the tutorial recalls the last exit point of the student and begins the tutorial for the student at the exit point 202.

At any point during the tutorial, the student may review completed transactions and updated records 204. After reviewing the transactions that have been completed and/or the records that have been updated, the tutorial may be continued at the point where the student left off.

Upon invocation and initialization, introductory text, background information, and explanations are displayed as appropriate, as well as presentations of theories, concepts, rules, records with prior periods' balances, and lists of current periods' transactions and requirements 206. Presentation of this information prepares the student to successfully engage the life-like situations that will be presented to him by the tutorial. Prepared by the introductory and preparatory material, when presented with the life-like situation, the student's knowledge of the subject matter addressed will be reinforced and the student's confidence will be enhanced. Further, as the situation presented to the student is life-like in nature, engagement of the situation prepares the student in real-life situations. When actual performance is required of the student under professional conditions, the student will be better prepared to address and resolve the situation (having seen it before) and will also be able to recognize unusual or unique circumstances that require greater attention.

Upon presentation of the preparatory material to the student 206, the next transaction (which may be the first transaction if the student has invoked the tutorial for the first time) is presented to the student for examination, analysis, and resolution 208. Inquiries are made of the student by the tutorial (as in the form of questions to be answered) to verify that the student understands the transaction 210. If the student does not understand the transaction 210, help may be sought 212 so that the student can better analyze the transaction. Once the student understands the transaction, the transaction must be entered into a journal of the student's selection 214.

Inquiry is made of the student by the tutorial as to the journal in which the transaction should be entered 214. The student responds to the inquiry. If the response is incorrect, the tutorial addresses the student's error by supplying the help or clues needed by the student in order to correctly respond to the inquiry 216. Should the student incorrectly respond to the journal inquiry again 214, the same, or additional, help may be delivered to the student so that the error may be corrected 216.

When the student correctly responds to the journal inquiry 214 by indicating in which journal the present transaction should be entered, the tutorial inquiries of the student as to which accounts should be debited and credited 218. At this point, the student may be presented with a multiple of choices for the answer 220 in order to help the student learn debiting, crediting, and the accounts which may be debited and credited. It is also possible for the student to provide the entire answer rather than selecting a single answer from a multiple of choices.

Upon selection by the student of one choice, the tutorial evaluates the student's response. If the response is incorrect, the student is allowed to select another answer. Additional information, clues, or help may be supplied by the tutorial to the student in order to aid the student in selecting the correct answer 222. Once the student has selected the correct accounts for debiting and crediting, the actual recording of the transaction by the student may take place.

In actually recording the transaction 224, the student is presented with an image of the sheets upon which the actual recordation takes place. With the presentation of life-like images of the entry sheets, the student is able to gain familiarity with his trade and the actual mechanics of practicing it. In alternative embodiments, other life-like images could be presented to the student that simulate the actual materials, products, and/or elements that are necessary for the student to practice the sought profession. One alternative embodiment would be a human anatomical tutorial for medical students. With increased availability of sophisticated computer-generated graphics, such as that seen in the nascent art of "visual reality" machines, it may soon be possible to provide medical students with anatomical tutorials so that the dissection of a human cadaver can be performed virtually on a computer rather than actually on a formalin-saturated corpse.

Returning to the accounting tutorial embodiment, the student enters the appropriate entries into the accounts debited and credited 224. Should the student make an error in numerical entry, the tutorial detects the error, informs the student of the error, and prevents the student from progressing further in the tutorial until the error is corrected 226.

Once the accounts have been correctly debited and credited, the tutorial inquires of the student whether or not the just-made journal entries should be posted to any of the ledgers 228. The student must decide if any of the entries just made need to be posted. Some journal entries do need to be posted immediately, while others do not. The student may respond by indicating either that posting is required or that posting is not required at that time. Depending on the transaction, the student can be either correct or incorrect in either response.

If the student is incorrect in deciding whether or not part or all of the transaction should be posted to one or more ledgers 228, help is provided for the student by the tutorial explaining how to arrive at the correct response 230. The student is them allowed again to supply the correct response 228. If the student correctly answers that no posting should occur 232, the tutorial skips the posting sequence of the tutorial and proceeds to check if there are any more transactions for the student to examine/record 256.

If the student correctly answers that the posting should occur 234, the tutorial inquires of the student as to which ledger should the entry be posted 235. The student must correctly respond by identifying and indicating the ledger(s) to which the transaction should be posted. The tutorial may help the student by supplying several choices from which the student may pick one. Alternatively, the student may have to supply the answers without the tutorial providing several possible answers to the student. If the student responds incorrectly, the tutorial supplies the student with information, help, and/or clues that will allow the student to better answer the inquiry 238. Once the student has correctly responded to the inquiry, the tutorial "pulls" the ledger for the student by presenting the student with an image of the actual ledger account to which the entry should be posted 240. Presenting the student with a life-like image of the ledger account familiarizes the student with the accounting process in much the same way as the presentation of the life-like journal sheets. In both cases, student confidence and ability is augmented.

The student then performs the actual posting and balancing of the ledger accounts 242. If the student incorrectly posts or balances the ledger accounts, the tutorial alerts the student to the error and prevents further progress in the tutorial. The tutorial then supplies the student with information, clues, and/or help that aids the student in successfully posting and balancing the ledger accounts 244. If in posting and balancing the student makes mathematical errors, the tutorial detects these errors, indicates to the student that such errors have occurred, and allows the student to post the correct amounts 246. The tutorial prevents the student's further progress in the tutorial until the correct amount has been posted.

Once the student has correctly posted and balanced the ledger accounts 242, the ledger accounts require proper cross-referencing to the journals 248. The tutorial inquires of the student as to how the ledger entries should be cross-referenced. The student's response is evaluated by the tutorial. If the student's responses are incorrect, the student is alerted to the error and the tutorial supplies the student with information, help, and/or clues that guide the student in deciding upon the correct cross-references 250. The student may then answer the question again. If the student's response is correct, the tutorial proceeds to engage the different posting steps necessary, if any, for the student's benefit.

Figure 2B:
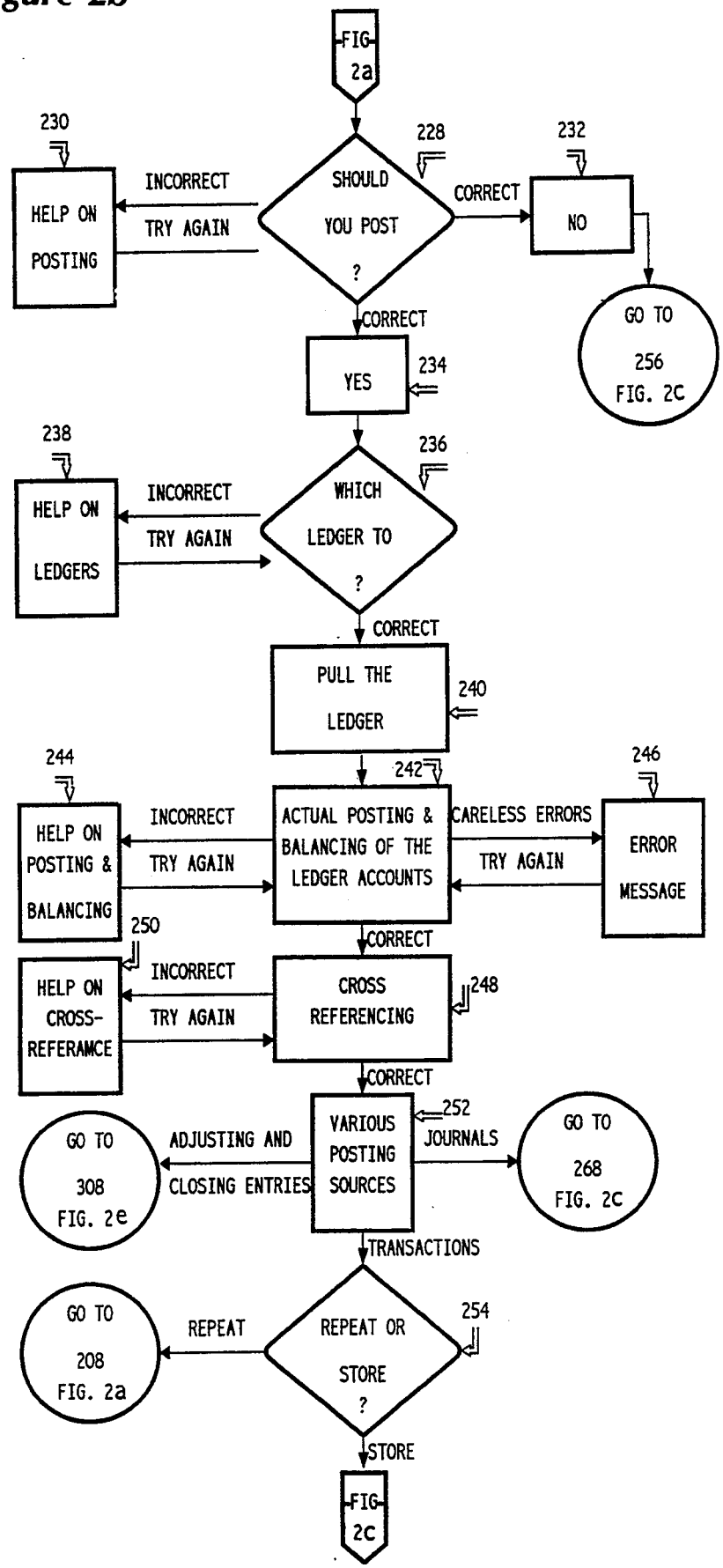
Figure 2C:
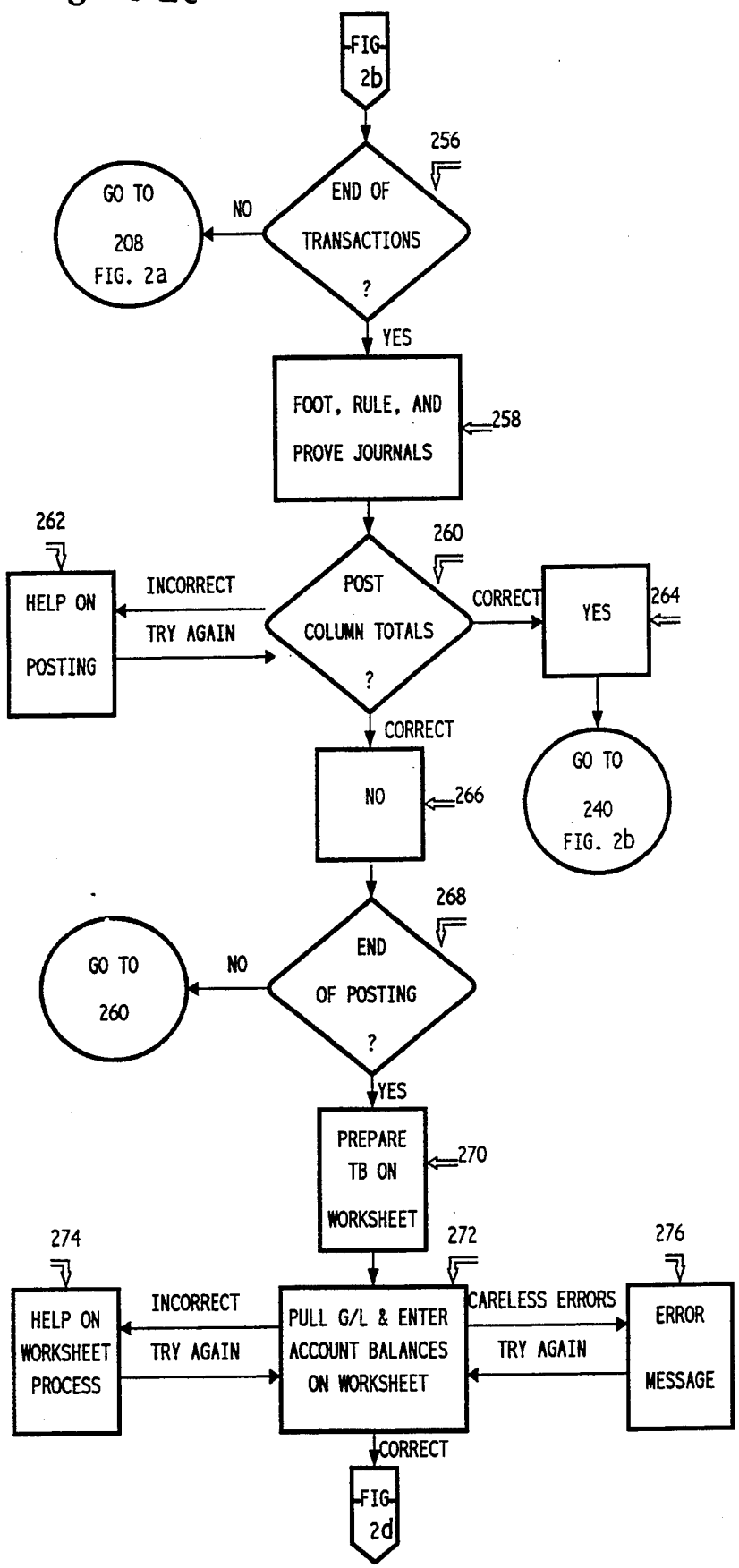

If journal entries need to be posted, the tutorial proceeds to step 268 of FIG. 2c. If adjusting and closing entries need to be made, the tutorial proceeds to step 306 of FIG. 2e.

If the transaction is complete, the student may repeat it or store it 254. If the student does not want to repeat this transaction 254, the records of the tutorial for the accounting entries are updated and preserved for future tutorial use as the transaction has been completely recorded. If the student wants to repeat this transaction to clarify any difficulties encountered with the transaction 254, the transaction may be re-engaged by the tutorial by commencing at step 208.

At the tend of any transaction, as in the case of all other options, the student may repeat the immediate transaction 254. If the student chooses to repeat the transaction 254, the tutorial proceeds to step 208 to present the transaction to the student again. If the student chooses not to repeat the transaction 254, the tutorial proceeds to check if all transactions are completed 256.

The tutorial then evaluates the progress the student has made through the tutorial as a whole. To this end, the tutorial checks to see whether or not any further transactions remain to be recorded by the student 256. If there are further transactions to be recorded, the tutorial first inquires of the student whether or not any prior transactions, including the one just-completed, should be reviewed. If the student chooses not to review the any transactions, the tutorial proceeds to step 208 in FIG. 2a and retrieves the next transaction for the student. This newly-retrieved transaction is then presented by the tutorial to the student in the manner set forth above for the immediately-preceding transaction. In this way, a student can become familiar with a variety of pertinent transactions through the tutorial.

Certain adjustments may be required to the tutorial method set forth above for certain types of transactions, but predominately, such adjustments will be evident by the type or components of the transaction.

If the student does choose to review any completed transactions, the student will also have the choice of reviewing all introductions or explanations presented in the completed transactions. If the student responds by choosing to review the introductory material, the tutorial presents the main tutorial introductory material to the student by returning to step 206 as shown in FIG. 2a, or any material presented at the beginning of each menu option as specific introduction of that option. The tutorial then proceeds with the next transaction 208 after the student finishes reviewing the introductory material. If the student chooses not to review the introductory material, the tutorial proceeds to step 208 of FIG. 2a as set forth above to engage the next transaction for the student.

As set forth above, the accounting embodiment of the tutorial method of the present invention repeatedly presents the student with transactions to be analyzed and understood. The student must correctly decide: into which journals the transactions should be entered, how such entries should be made into the journals, into which ledgers the journal entries should be posted, and how they should be posted. Upon deciding upon the correct journals and ledgers, the student then actually performs the entry and posting actions that are required in real-life situations. The life-like nature of the transactions is enhanced when the tutorial presents to the student life-like images of journal and ledger accounts on which the entries and postings are made. The student must decide upon proper cross-referencing and may make the cross-referencing entries with or without aid from the tutorial.

In one embodiment of the accounting tutorial embodiment, sixty-three (63) different transactions are subject to correct student interpretation and responses. These sixty-three transactions represent the entirety of transactions for one accounting period (one month) for a fictional auto parts supply shop. Once the student has correctly entered all sixty-three transactions into the books of the auto supply shop, the tutorial recognizes at step 256 in FIG. 2c that the transactions are at an end and that the month-end accounting procedure now needs to be engaged. Other accounting tutorial embodiments can present transaction for other forms of businesses like services, manufacturing, etc.

After the student has decided to store the transaction 254, the tutorial proceeds as shown in FIG. 2c beginning with step 256. When all transactions have been completed by the student 256, the student is now ready to prepare the appropriate financial documents reflecting the recorded transactions. The student is required to foot, rule, and prove the journals 258 by the tutorial. In footing, ruling, and providing the journals, the tutorial will not allow the student to progress further in the tutorial unless the process is completed properly. If errors are made, the student is alerted to the error and appropriate help is given by the tutorial to the student before the student attempts to respond correctly to the footing, ruling, and proving portion of the tutorial 258.

Once the student has correctly footed, ruled, and proved the journals 258, the tutorial inquires of the student as to whether the column totals of the journals should be posted 260. Since some journal column totals are posted, while others are not, the student must correctly decide which journal column totals should be posted. If the student responds incorrectly to the tutorial inquiry 260, information, help, and/or clues are provided by the tutorial to the student to aid in deciding correctly whether or not the journal column totals should be posted 262. The student is then allowed to respond as many additional times as necessary until arriving at the correct response. For each incorrect response, the student is provided with helpful information from the tutorial.

If the student correctly responds that the journal column total should be posted 264, the tutorial proceeds to step 240 of FIG. 2b to post the appropriate journal column total. If the student correctly responds that the journal column total should not be posted 266, then the tutorial checks to see if all posting has been completed and that the posting process for journal column totals of the tutorial is at an end 268. If more journal column totals remain to be addressed by the student, the tutorial proceeds to step 260 of FIG. 2c.

If all journal column totals have been posted, the tutorial proceeds to the preparation of the trial balance on the work sheet 270. As will all pertinent portions of the tutorial method of the present invention, the preparation of the work sheet and its trial balance is presented to the student in a life-like manner on a work sheet that resembles actual work sheets used in real-life accounting situations.

Upon presenting the work sheet with its trial balance to the student 270, the tutorial requires the student to correctly pull the general ledger and to enter the account balances of the general ledger onto the work sheet 272. During this portion of the tutorial, should the student make an incorrect response and, for example, enter an incorrect number from the general ledger to the work sheet, the tutorial will detect the error and indicate it to the student. The tutorial will then present to the student information, help, and clues appropriately addressing the student's error so that the student will understand that error has been made and how to avoid it in the future 274. Careless mathematical errors are also detected by the tutorial and indicated to the student 276. The tutorial allows the student to respond with the correct amounts. The tutorial prevents the student's further progress in the tutorial until the correct response to given by the student. After the student has reviewed the help information presented by the tutorial 274, the student may attempt to make the correct responses. Any incorrect responses made by the student will be detected by the tutorial and addressed as indicated above.

Figure 2D:
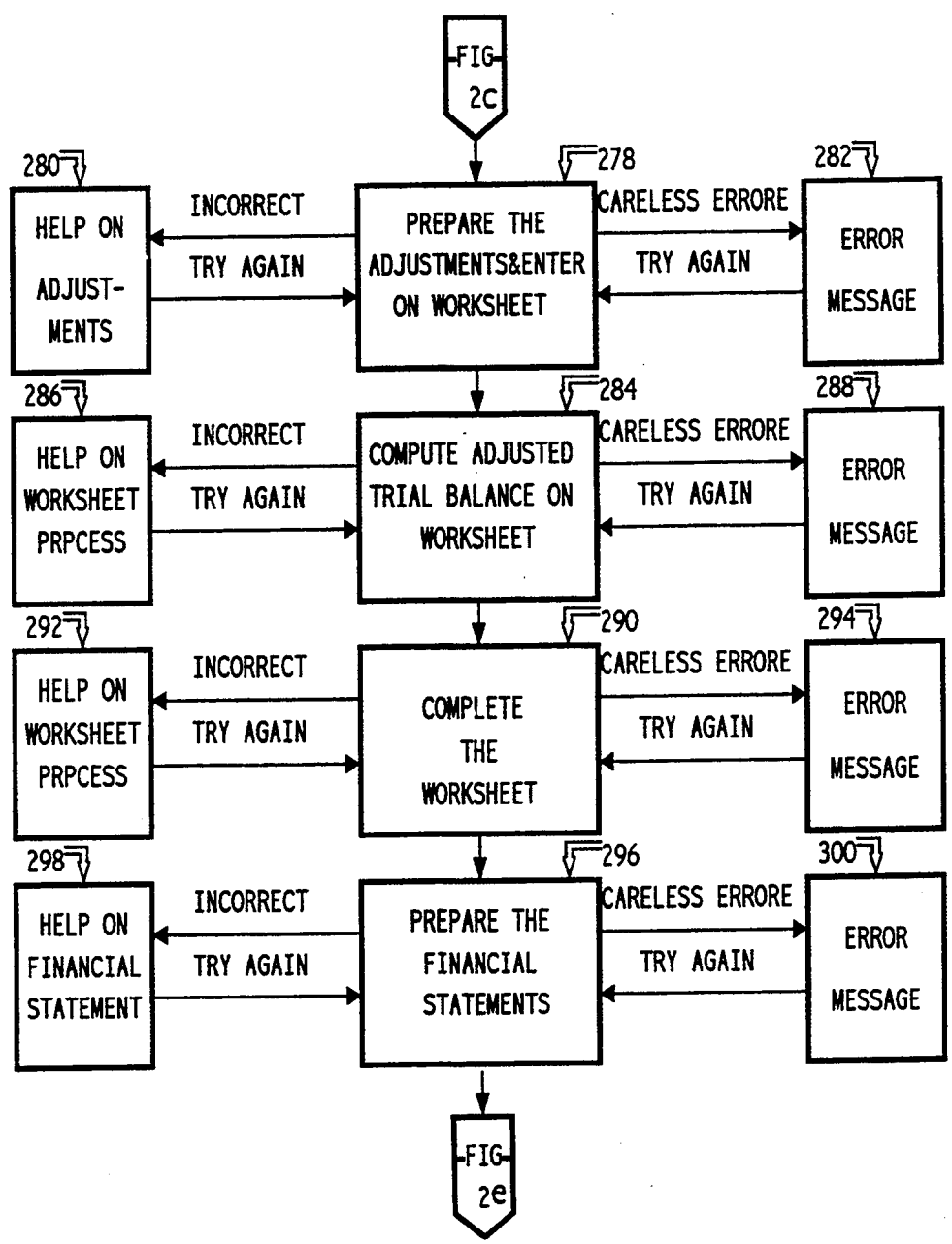

Once the student has correctly entered the account balances from the general ledger to the work sheet 272 and as shown in FIG. 2d, the tutorial then requires the student to prepare the adjusting entries and to enter then upon the work sheet 278. Should the student make an error or an incorrect entry, the tutorial will detect the error and alert the student. The tutorial will then present to the student information, help, and clues appropriately addressing the student's error so that the student will understand what error has been made and how to avoid it in the future 280. After the student has reviewed the help information presented by the tutorial 280, the student may attempt to make the correct responses. Careless mathematical errors are also detected by the tutorial and indicated to the student 282.

After the student has correctly prepared the adjusting entries and has correctly entered them on the work sheet 278, the tutorial then requires the student to complete the adjusted trial balance 284. Should the student make an error or an incorrect entry, the tutorial will detect the error and alert the student. The tutorial will then present to the student information, help, and clues appropriately addressing the student's error so that the student will understand what error has been made and how to avoid it in the future 286. After the student has reviewed the help information presented by the tutorial 286, the student may attempt to make the correct responses. Careless mathematical errors are also detected by the tutorial and indicated to the student 288.

Upon correctly completing the adjusted trial balance 284, the tutorial requires the student to correctly complete the work sheet 290. Should the student make an error or an incorrect entry, the tutorial will detect the error and alert the student. The tutorial will then present to the student information, help, and clues appropriately addressing the student's error so that the student will understand what error has been made and how to avoid it in the future 292. After the student has reviewed the help information presented by the tutorial 292, the student may attempt to make the correct responses. Careless mathematical errors are also detected by the tutorial and the indicated to the student 294.

After the student has correctly completed the work sheet 290, the tutorial requires the student to prepare the financial statements 296. Should the student make an error or an incorrect entry, the tutorial will detect the error and alert the student. The tutorial will then present to the student information, help, and clues appropriately addressing the student's error so that the student will understand what error has been made and how to avoid it in the future 298. After the student has reviewed the help information presented by the tutorial 298, the student may attempt to make the correct responses. Careless mathematical errors are also detected by the tutorial and indicated to the student 300.

Figure 2E:
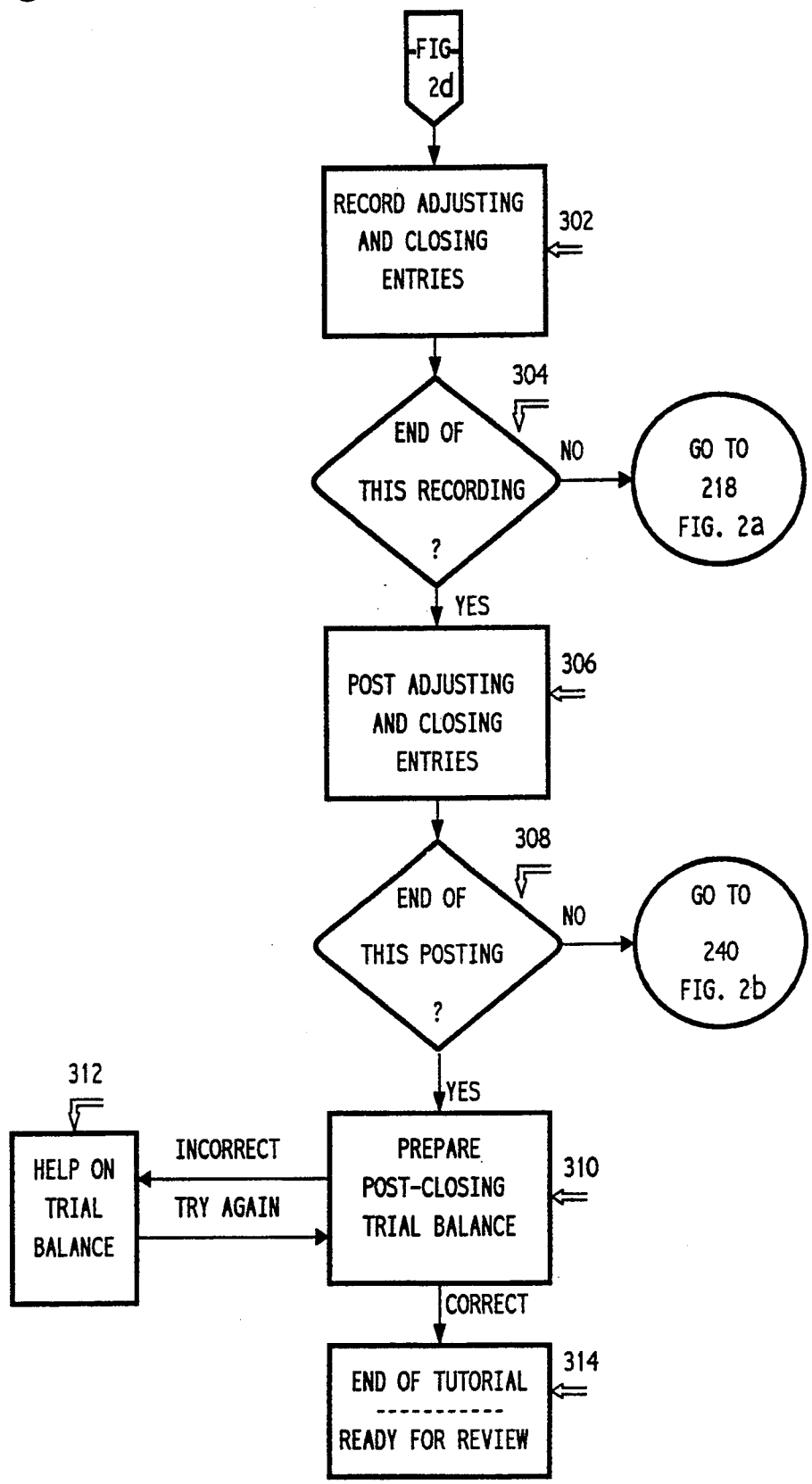

The tutorial then continues with its instruction as shown in FIG. 2e. Upon correctly completing the financial statement 296, the tutorial requires the student to record the adjusting and closing entries 302. For this, the tutorial takes the student through steps 218 through 226 of FIG. 2a. Should the student make an error or an incorrect entry, the tutorial will detect the error and alert the student. The tutorial will then present to the student information, help, and clues appropriately addressing the student's error so that the student will understand what error has been made and how to avoid it in the future 222 of FIG. 2a. After the student has reviewed the help information presented by the tutorial 222, the student may attempt to make the correct responses. Careless mathematical errors are detected by the tutorial and indicated to the student 226. The tutorial allows the student to respond with the correct amounts. The tutorial prevents the student's further progress in the tutorial until the correct response is given by the student.

For all stages of work sheet, the financial statements, and the recordation of the adjusting and closing entries, the tutorial presents the student with life-like sheets that would be used by an actual accountant in performing those tasks. Enhancement of the student's ability and confidence are achieved by acquainting the student with life-like sheets and that tasks to which those sheets are put.

If the recording of the adjusting and closing entries is not yet at an end 304, the tutorial proceeds to step 218 of FIG. 2a. If the recording of the adjusting and closing entries is at an end 304, the tutorial proceeds to the posting the adjusting and closing entries 306.

Upon correctly recording the adjusting and closing entries, the tutorial requires the student to post those entries 306. This is a basic mechanical step and the student is prevented from proceeding further if erroneous postings are made. Once the student has finished posting the adjusting and closing entries 306, the tutorial checks to see if all posting has been completed 308. If all posting has not been completed, the tutorial proceeds to step 240 of FIG. 2b. Otherwise, the tutorial requires the student to prepare the post-closing trial balance 310. Should the student make an error or an incorrect entry, the tutorial will detect the error and alert the student. The tutorial will then present to the student information, help, and clues appropriately addressing the student's error so that the student will understand what error has been made and how to avoid it in the future 312. After the student has reviewed the help information presented by the tutorial 312, the student may attempt to make the correct responses.

Upon correctly preparing the post-closing trial balance, the tutorial programs has been completed by the student 314. The student has completed a life-like tutorial using tools and materials similar to that of a real-life accountant in a real-life situation. The different tasks performed by the student are available for review.

Figure 3A:
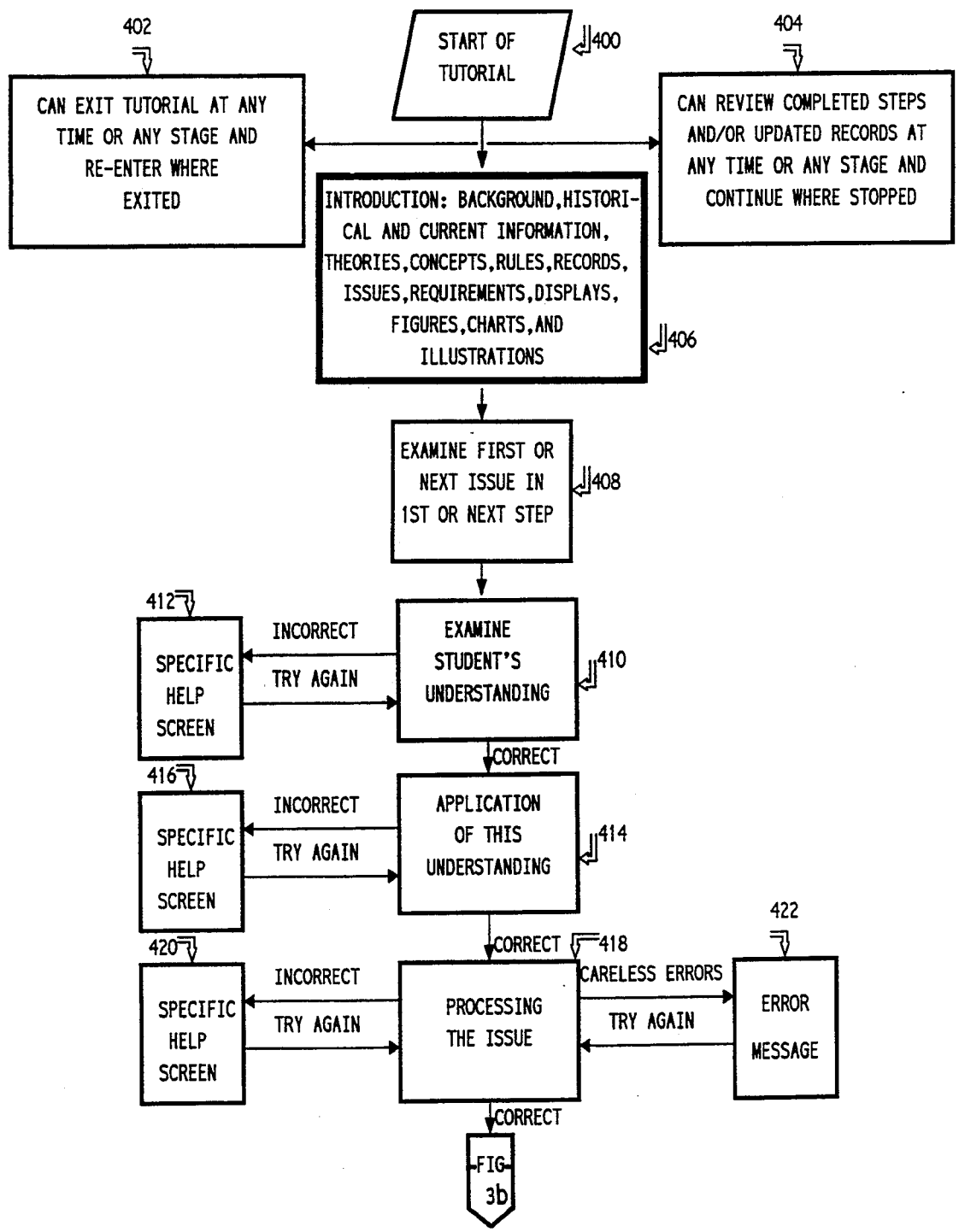
FIGS. 3a–3b are schematic block diagrams showing the tutorial method of the present invention as applied to any field of learning.
Figure 3B:
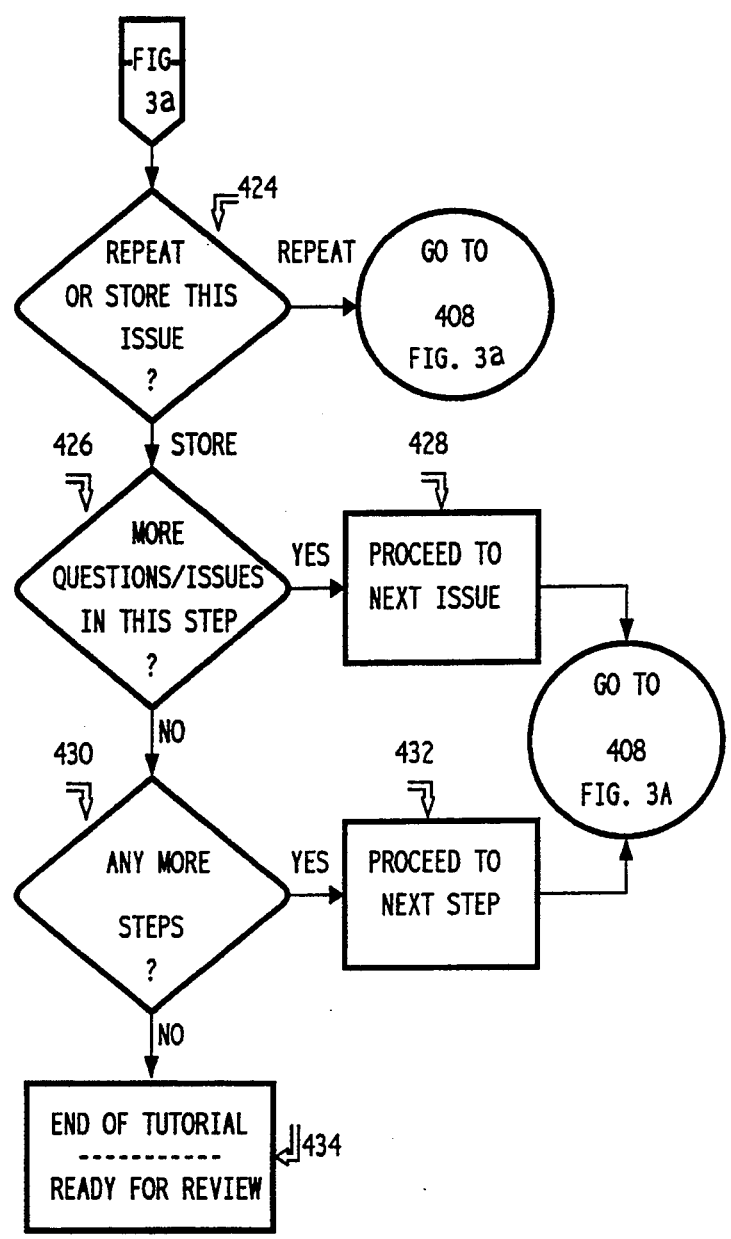

Referring now to FIGS. 3a and 3b, a more generalized method of instruction is set forth that is applicable not only to accounting, but to other professional fields as well, such as medicine, law, engineering, and the like.

In order to begin the general tutorial method of the present invention, the tutorial is invoked 400 by the student or otherwise. As for the embodiment for an accounting tutorial (FIGS. 2a–2e), the general tutorial method initializes and prepares the tutorial for the student. The generation and maintenance of several information files may remain useful so that different portions of the tutorial may operate independently by referring to those files for needed or useful information. Some of these files may contain information records that are supplied form the student (with the help of the tutorial).

Once invoked, the tutorial allows the student to exit at any time or at any stage of the tutorial 402. When exit is made by the student from the tutorial, the tutorial saves the point at which the student made exit. When invoked again later, the tutorial recalls the last exit point of the student and begins the tutorial for the student at the exit point 402.

At any point during the tutorial, the student may review completed transactions and updated records 404. After reviewing the transactions that have been completed and/or the records that have been updated, the tutorial may be continued at the point where the student left off.

Upon invocation and initialization, introductory text, background information, and explanations are displayed as appropriate, as well as presentations of theories, concepts, rules, historical and pertinent information, current issues, as well as various instructional and information displays, figures, and/or charts, and requirements 406. Presentation of this information prepares the student to successfully engage the life-like situations that will be presented to him by the general tutorial. When presented with the life-like situation prepared by the introductory and preparatory material, the student's knowledge of the subject matter addressed will be reinforced and the student's confidence will be enhanced. Further, as the situation presented to the student is life-like in nature, engagement of the situation prepares the student in real-life situations. When actual performance is required of the student under professional conditions, the student will be better prepared to address and resolve the situation (having seen it before) and will also be able to recognize unusual or unique circumstances that require greater attention.

Once the student reviews and understands the introductory material 406, the next issue or subject (which may be the first issue or subject) of the tutorial is presented 408. Such an issue or subject may be a specific rule of law for a legal tutorial, a certain surgical procedure or therapeutic treatment options for a certain condition or disease for a medical tutorial, or a concept, theory, or problem-solution for an engineering tutorial. The issue is presented to prepare the student to approach and address the upcoming life-like situation applying the student's knowledge.

After the student has examined the current issue or step of the tutorial 408, the student's understanding of the issue is confirmed by questions and answers or other means that test the student's knowledge and understanding 410. The student must respond to the tutorial's inquiries and in doing so the tutorial can confirm through the correct answers of the student that the student understands the current issue. If the student incorrectly responds to the tutorial's inquiries, help is given to the student by means of information, clues, displays, figures, and/or directions that allow the student to better and more correctly responds to the inquiries 412. The tutorial then re-inquires of the student regarding the current issue. Until the student demonstrates that the current issue is understood, the tutorial prevents the student's further progress through the tutorial.

Upon correctly responding to the tutorial's inquiries 410, the student must then correctly engage the life-like situation presented by the tutorial to the student 414. Such life-like situations may include: the correct application of a rule of law under circumstances encountered in the actual practice of law, a surgical procedure as would be encountered in the operating room, or the application of a certain concept, idea, method, or mathematical solution as encountered by a consulting engineer. To the extent possible and practical, the life-like situation is presented to the student as, at least, a visual image and the student's responses are portrayed as a part of that image. The student must correctly engage the life-like situation applying the knowledge required for the current issue before further progress can be made the tutorial.

If the student does not correctly apply the knowledge required for the application, help is given to the student by the tutorial through the display of information, clues, displays, figures, and/or directions necessary to guide the student through the application 416. Once the help information is presented to the student, the student may again attempt to correctly engage the life-like application. When the student incorrectly engages the application, the tutorial alerts the student to the error and presents information appropriate to the error so that the student can learn from the mistake. Such mistakes made by the student do not incur the same consequences as would mistakes made under real circumstances. The life-like conditions of the tutorial provide the student with necessary experience without the sometimes dire consequences that can occur as a result of mistakes.

Once the student has correctly engaged the application of the knowledge to be applied for the current issue, the issue can be processed 418. Conceptual errors made by the student are addressed through help given to the student through the tutorial 420. Such help includes information, clues, displays, figures, charts, and/or directions that allow the student to correct the mistakes and to understand how they occurred. Careless or inadvertent errors are detected by the tutorial which alerts the student to the error so that it may be corrected 422.

The processing of the issue 418 continues until all errors (if any) are corrected. Referring to FIG. 3b, once the processing 418 ends, inquiry is made by the tutorial to the student as to whether the issue should be repeated 424. If the student desires to repeat the issue again, the tutorial proceeds through the issue beginning at step 408, or beginning at step 406, as the student chooses. If the student does not desire to repeat the issue 424, the tutorial checks to see if there are more questions and/or issues that should be presented to the student 426 in this continuous process.

If there are more questions and/or issues to the current step 426, the tutorial proceeds to present those other issue(s) to the student 428. The tutorial proceeds to step 408 to present the subsequent issues in the process to the student.

If there are no more questions and/or issues in the current step 426, and the student chooses 430 to continue to go on to the next step, the tutorial examines another issue 432 and takes the student to step 408 to examine the next issue or step. If there are no more issues or steps remaining, the tutorial will end 434 and the student has completed a life-like tutorial using tools and materials similar to that of a real-life professional in a real-life situation.

The different tasks performed by the student are available for review. If the student chooses to end the tutorial temporarily, the student so indicates to the tutorial and the tutorial ends. Prior to exit from the tutorial, the student may review any previous steps/issue taken so that the student might better understand the subject matter previously covered by the student through the tutorial 402.

While the present invention has been described with regards to particular embodiments, it is recognized that additional variations of the present invention may be devised without departing from the inventive concept.

A computer program listing in accordance to 37 C.F.R § 1.96 of the accounting embodiment of the present inventive method precedes the claims.

What I claim is:

1. A tutorial method for instructing a student on accounting, comprising:
    presenting the student with a first accounting transaction;
    verifying the student's understanding of the transaction;
    requiring the student to correctly select journals for entering the transaction;
    requiring the student to correctly debit and credit the proper journals;
    presenting to the student life-like images of the journal sheets;
    requiring the student to correctly record the transaction in the selected journals in the life-like journal sheets;
    requiring the student to correctly decide if the journal entries should be posted; and
    presenting to the student life-like images of ledger sheets if the journal entries should be posted and requiring the student to post the appropriate journal entries in the life-like ledger sheets.

2. The tutorial method for instructing a student on accounting as set forth in claim 1, further comprising the steps of:
    presenting the student with a second accounting transaction after the first accounting transaction has been successfully engaged by the student;
    requiring the student to correctly select journals for entering the second transaction;
    requiring the student to correctly debit and credit the proper journals;
    presenting to the student life-like images of the journal sheets;
    requiring the student to correctly record the second transaction in the selected journals in the life-like journal sheets;
    requiring the student to correctly decide if the journal entries should be posted; and
    presenting to the student life-like images of ledger sheets if the journal entries should be posted and requiring the student to post the appropriate journal entries in the life-like ledger sheets.

3. The tutorial method for instructing a student on accounting as set forth in claim 1, further comprising the steps of:
    determining if the student has correctly recorded all available transactions; and
    requiring the student to correctly prepare appropriate financial documents reflecting the recorded transactions.

4. The tutorial method for instructing a student on accounting as set forth in claim 3, wherein the step of requiring the student to correctly prepare the appropriate financial documents further comprises the steps of:
    requiring the student to foot, rule, and prove the journals on the life-like journal sheets;
    providing life-like ledger sheets and requiring the student to correctly post the appropriate journal column totals to the appropriate ledgers;
    providing the student with a life-like work sheet;
    requiring the student to correctly prepare a trial balance on the work sheet;
    requiring the student to correctly prepare the adjustments to the work sheet and to enter them on the work sheet;
    requiring the student to correctly compute and enter the adjusted trial balance on the work sheet;
    requiring the student to correctly complete the work sheet; and
    requiring the student to correctly prepare the financial statements.

5. The tutorial method for instructing a student on accounting as set forth in claim 4, further comprising the step of providing the student with help when the student responds incorrectly.

6. The tutorial method for instructing a student on accounting as set forth in claim 5, wherein the step of providing the student with help further comprises the step of providing the student with helpful information that is appropriate for the error just made by the student.

7. The method for student instruction as set forth in claim 6, wherein the method is implemented on a machine.

8. The method for student instruction as set forth in claim 7, wherein the machine is a computer.

9. A tutorial method for instructing students in accounting, comprising the steps of:
    presenting a first transaction to the student for examination and understanding;
    presenting life-like journal sheets to the student for entering the transaction;
    requiring the student to correctly enter the transaction in appropriate journals;
    presenting life-like ledger sheets to the student for posting the transaction;
    requiring the student to correctly post the transaction to the ledger sheets;
    presenting a second transaction to the student for examination and understanding;
    presenting life-like journal sheets to the student for entering the second transaction;
    requiring the student to correctly enter the second transaction in appropriate journals;
    presenting life-like ledger sheets to the student for posting the second transaction;
    requiring the student to correctly post the second transaction to the ledger sheets;
    presenting a life-like work sheet to the student for generating a trial balance;
    requiring the student to correctly create a trial balance on the life-like work sheet;
    requiring the student to correctly prepare the adjustments on the work sheet; and requiring the student to correctly prepare the financial statements.

10. The tutorial method for instructing students in accounting as set forth in claim 9, comprising the further step of providing the student with help when the student responds incorrectly.

11. The tutorial method for instructing students in accounting as set forth in claim 10, wherein the step of providing the student with help further comprises the step of providing the student with helpful information that is appropriate for the error just made by the student.

12. The method for student instruction as set forth in claim 11, wherein the method is implemented on a machine.

13. The method for student instruction as set forth in claim 12, wherein the machine is a computer.

14. A tutorial method for instructing a student on the practical application of a subject, comprising:
   providing the student a body of information relevant to said subject;
   presenting the student a simulated life-like situation having at least one state goal to be attained related to said subject, said goal being attainable only upon the satisfactory performance of a series of steps involving the application of said information, each of said series of steps except for the first can be undertaken only upon the satisfactory performance of a previous one of said steps;
   requiring the student to perform said series of steps in some order, while preventing the student from performing a step which previously has been satisfactorily performed, whereby, each completed step effectively becomes a part of the body of information relevant to the subject; and
   enabling the student to exit at any one of said series of steps for the purpose of reviewing said body of information and said previously satisfactorily performed steps, and thereafter to return to said exited step and to continue performing said series of steps.

15. A tutorial method in accordance with claim 14, wherein said steps comprise simulated life-like actions carried out in said life-like situation.

16. A tutorial method in accordance with claim 15, wherein said method is implemented on a machine.

17. A tutorial method in accordance with claim 16, wherein said machine is a computer.

* * * * *